United States Patent [19]

Fujioka

[11] Patent Number: 5,438,675
[45] Date of Patent: Aug. 1, 1995

[54] INITIALIZATION SYSTEM FOR INPUT/OUTPUT PROCESSING UNITS

[75] Inventor: Shuntaro Fujioka, Kawasaki, Japan

[73] Assignee: Fujitsu Limited, Kawasaki, Japan

[21] Appl. No.: 80,284

[22] Filed: Apr. 29, 1993

Related U.S. Application Data

[63] Continuation of Ser. No. 520,616, May 8, 1990, abandoned.

[30] Foreign Application Priority Data

May 9, 1989 [JP] Japan .................. 1-115793

[51] Int. Cl.⁶ .......................................... G06F 11/267
[52] U.S. Cl. .................... 395/182.07; 364/DIG. 1; 364/265.5; 364/266.5; 395/835; 395/185.01
[58] Field of Search ............... 371/16.1; 395/575, 275; 364/DIG. I

[56] References Cited

U.S. PATENT DOCUMENTS

| | | | |
|---|---|---|---|
| 4,313,162 | 1/1982 | Baun et al. ........................ | 364/200 |
| 4,381,540 | 4/1983 | Lewis et al. ...................... | 364/200 |
| 4,395,755 | 7/1983 | Wakai ............................... | 364/200 |
| 4,701,845 | 10/1987 | Andreason et al. ............... | 364/200 |
| 4,845,609 | 7/1989 | Lighthart et al. ................. | 364/200 |
| 4,999,838 | 3/1991 | Horikawa ......................... | 371/16.1 |

FOREIGN PATENT DOCUMENTS 58-195915 11/1983 Japan .
59-221723 12/1984 Japan .
64-25249 1/1989 Japan .
64-84337 3/1989 Japan .

OTHER PUBLICATIONS

Slater, M., *Microprocessor-Based Design*, 1987, Mayfield Publishing Co., pp. 445–450.

*Primary Examiner*—Stephen M. Baker
*Attorney, Agent, or Firm*—Staas & Halsey

[57] ABSTRACT

A computer system includes a central processing unit, a computer maintenance unit and an input/output processing section having a plurality of input/output processing units each of which is associated with a respective input/output device. When a failure occurs in an input/output processing unit, the input/output processing unit control section detects the occurrence of a failure, reports it to the central processing unit and requests the computer maintenance unit to acquire failure information from a failed input/output processing unit and to initialize the input/output processing unit. After acquisition of the failure information, the computer maintenance unit initializes the failed input/output processing unit and reports the termination of the initialization to the input/output processing unit control section. Afterward, the input/output processing unit control section informs the central processing unit of the termination of the initialization of the failed input/output processing unit.

10 Claims, 12 Drawing Sheets

INITIALIZATION SYSTEM FOR INPUT/OUTPUT PROCESSING UNITS

This application is a continuation of application Ser. No. 07/520,616, filed May 8, 1990, now abandoned.

BACKGROUND OF THE INVENTION

1. Field of the Invention

The present invention relates to a fault recovery system for units of a computer system, and more particularly to an initialization system for input/output processing units of a computer system including a central processing unit, input/output processing units and a computer maintenance unit, all of which are independently installed.

2. Background of the Invention

Figure 1:
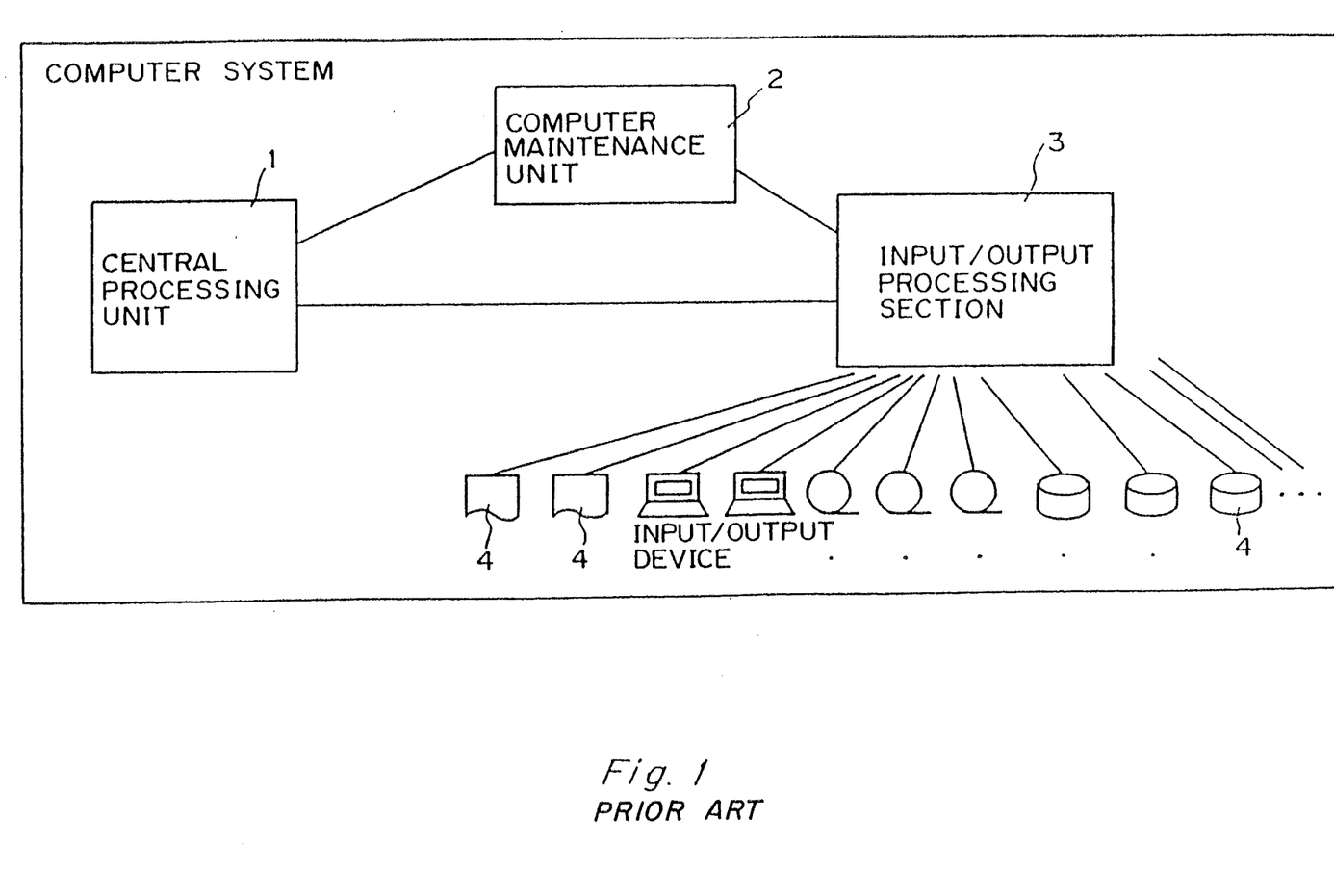
FIG. 1 is a block diagram of a computer system including a computer maintenance unit.

Many recent computer systems include a computer maintenance unit, i.e., a service processor (SVP), adapted to recover from a failure occurring in the system and to acquire information on the failure in order to decrease the load on the central processing unit and the input/output processing units to thereby improve performance. An example of such a computer system is illustrated in FIG. 1. As shown, the system includes a central processing unit 1, a computer maintenance unit 2 and an input/output processing section 3 including input/output processing units and a number of input/output devices 4, each of which are connected to respective input/output processing units.

In this computer system, a dedicated recovery instruction for the input/output processing units is usually prepared in the central processing unit 1 in order to recover from failures in the input/output processing units. The instruction is issued from the central processing unit 1 to the computer maintenance unit 2, which in turn responds to the instruction to issue an input/output processing unit initializing signal to the input/output processing section 3. In general, the computer maintenance unit 2 has slow processing speed. Thus, the processes of acquiring failure information, recovering from a failure and initializing the input/output processing unit are queued in the computer maintenance unit 2 and then executed asynchronously.

If a malfunction occurs in an input/output processing unit, the input/output processing section 3 reports to the central processing unit 1 the occurrence of a malfunction by a malfunction-occurrence interruption and requests the computer maintenance unit 2 to acquire failure information (LOG). The request is temporarily entered into a process queue in the computer maintenance unit 2. That is, the request is enqueued.

Figure 2:
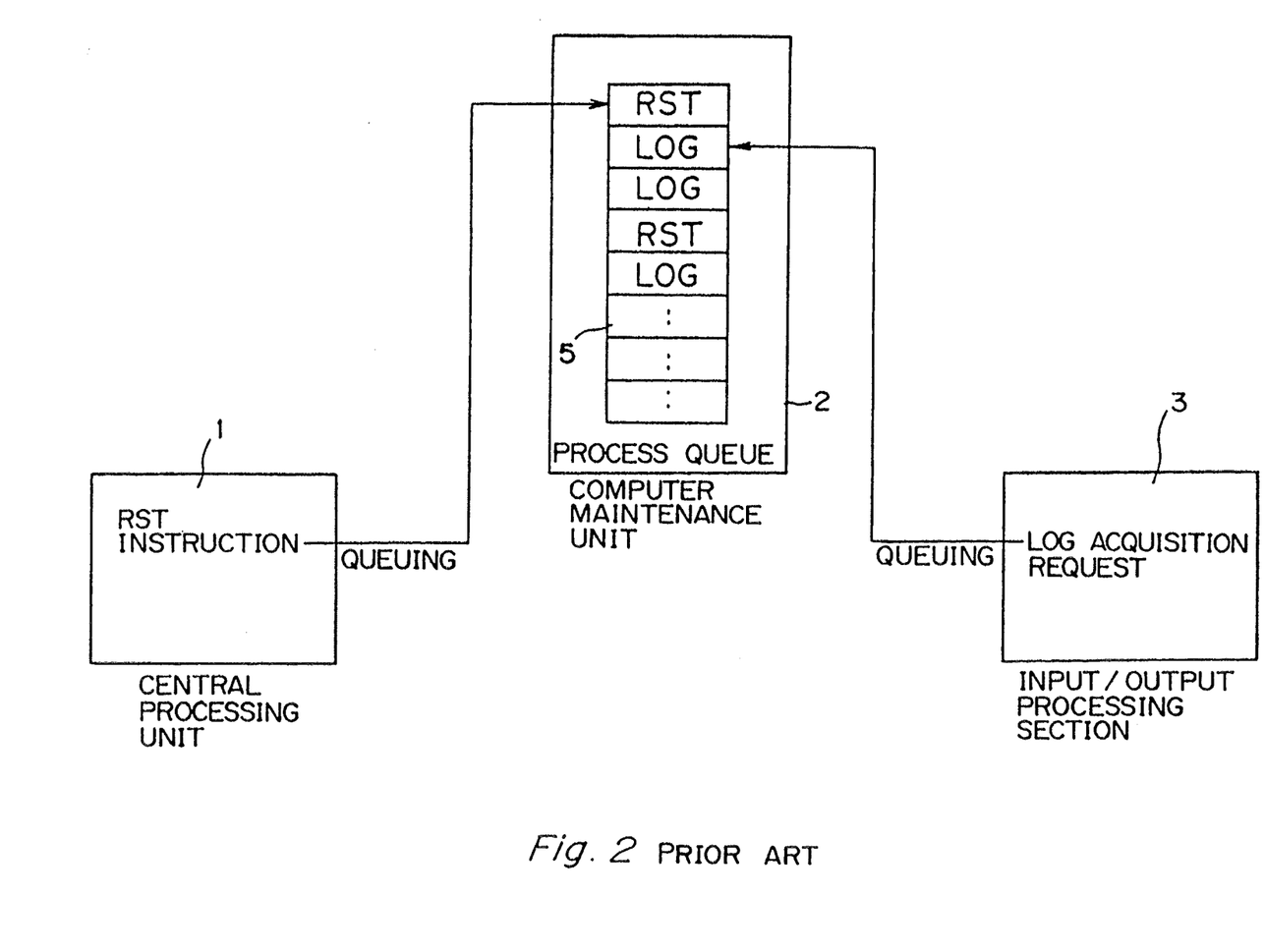
FIG. 2 is a diagram illustrating a prior art system for initializing an input/output processing unit.

FIG. 2 is a diagram illustrating a prior art system for initializing the input/output processing unit using the process queue in the computer maintenance unit. In the Figure, a request to acquire the LOG (failure information) from the input/output processing section 3 is enqueued as a request "LOG" in the process queue 5 in the computer maintenance unit 2.

The central processing unit I detects a malfunction in the input/output processing unit and then issues an instruction to recover it, i.e., a reset (RST) instruction, in a malfunction processing routine. The instruction is actually enqueued as a request to initialize the input/output processing unit (RST) in the process queue 5 in the computer maintenance unit 2. The computer maintenance unit 2 dequeues, i.e., fetches the requests from the process queue 5, one at a time for processing.

A problem with the prior art system for initializing the input/output processing units as shown in FIG. 2, i.e., the system for fetching and processing requests enqueued in the process queue 5 in the computer maintenance unit 2, is that the order of executing the processes enqueued in the process queue 5 is indeterminate. Thus, when a failure occurs in an input/output processing unit, an input/output processing unit initializing request (i.e., the RST instruction) made by the central processing unit 1 may be executed first and the acquisition of failure information from the input/output processing unit is then executed.

That is, the queuing within the process queue 5 is effected such that a request is enqueued in a vacated position of the process queue. However, where the execution of requests in the process queue is effected from the top of the queue, the initialization of the input/output processing unit may be performed first. In this case, the input/output processing unit is already initialized when the failure information is acquired. Thus, the acquired failure information is useless. Furthermore, even if the acquisition of failure information is enqueued first in the process queue 5, the initialization of the input/output processing unit may be made first because processing by the central processing unit 1 has the highest priority.

SUMMARY OF THE INVENTION

It is therefore an object of the present invention to acquire correct failure information by positively initializing an input/output processing unit after the acquisition of failure information.

A feature of the present invention resides in a computer system including a central processing unit, a computer maintenance unit and an input/output processing section having a plurality of input/output processing units each of which is associated with a respective input/output device, a method of initializing said input/output processing units comprising the steps of causing, when a failure occurs in an input/output processing unit in said input/output processing section, said input/output processing section to make a request to said computer maintenance unit to acquire failure information and initialize said failing input/output processing unit, causing said computer maintenance unit to initialize said failing input/output processing unit after the acquisition of the failure information, and causing said input/output processing section to report to said central processing unit the termination of initialization of said failing input/output processing unit.

DESCRIPTION OF THE PREFERRED EMBODIMENTS

Figure 3:
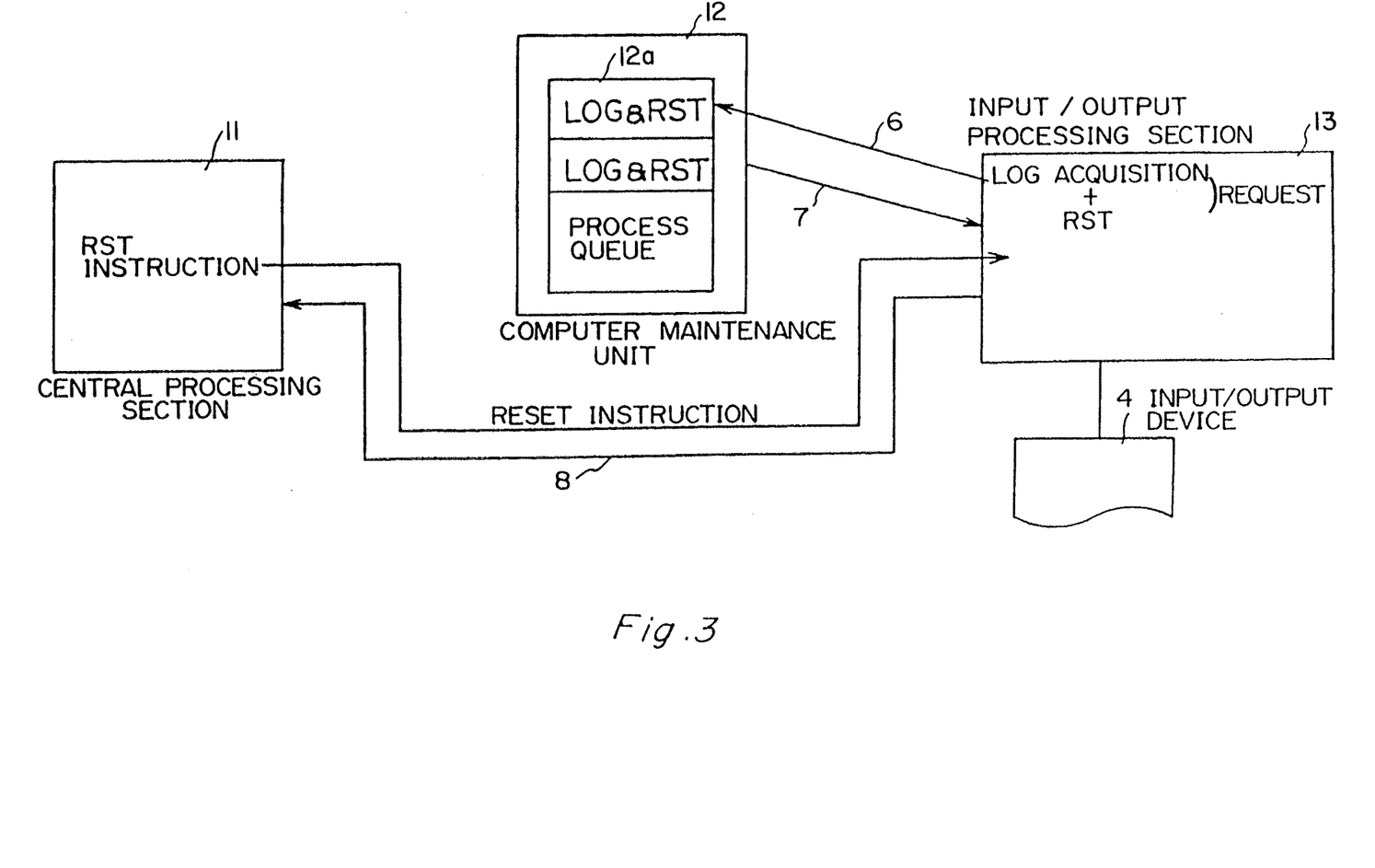
FIG. 3 is a block diagram of a computer system for use in the explanation of the principle of the present invention.

FIG. 3 is a block diagram of a computer system for explaining the principle of an input/output processing unit initializing system according to the present invention. As in FIG. 1, it illustrates a computer system comprising a central processing unit 11, a computer maintenance unit 12 and an input/output processing section 13 to which an input/output device 14 is connected.

Figure 4:
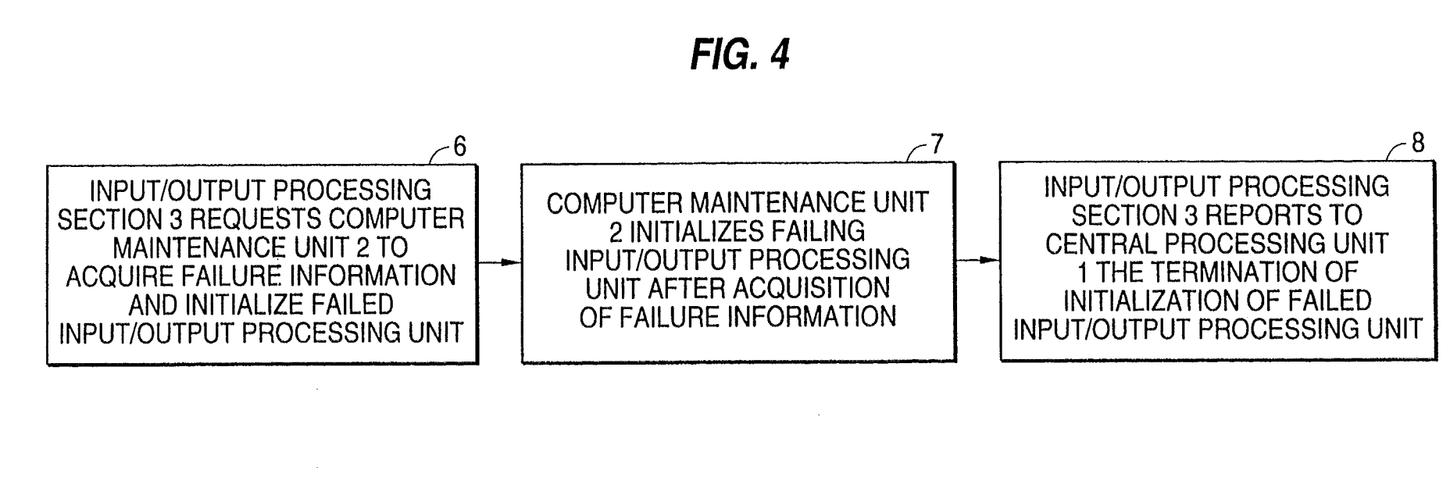
FIG. 4 is a diagram for explaining the procedure of the present invention.

FIG. 4 is a diagram for explaining the procedure of the input/output processing unit initializing system according to the present invention. In particular, it illustrates the procedure for initializing a failed input/output processing unit in the input/output processing section 3 which includes a plurality of input/output processing units, each connected to an individual input/output device, and an input/output processing unit control section for controlling the input/output processing units.

The present invention will be described with reference to FIGS. 3 and 4. When a failure occurs in an input/output processing unit in the input/output processing section 13, the input/output processing section 13 issues to the computer maintenance unit 12 a request to acquire failure information (LOG) and to initialize (RST) the by, for example, a command, (step 6). The request is enqueued in the process queue 12a in the computer maintenance unit 12.

Although not shown, the occurrence of a failure in the input/output processing unit is reported to the central processing unit 11 by the input/output processing section 13, for example, in the form of an interruption. In response to the interruption, the central processing unit 11 sends to the input/output processing section 13 a reset instruction indicating a request to initialize the failed input/output processing unit.

Before or after the reset instruction is entered into the input/output processing section 13, the computer maintenance unit 12 acquires failure information from the failed input/output processing unit in the input/output processing section 13 and initializes it (step 7). Finally, the input/output processing section 13 reports the termination of the initializing process to the central processing unit 11 (step 8).

Even if the reset instruction has been entered from the central processing unit 11 into the input/output processing section 13 before the failed input/output processing unit is initialized by the computer maintenance unit 12 in step 7, the input/output processing section 13 will not execute the instruction and the central processing unit 11 can learn from the termination of resetting when it is informed by the input/output processing section 13 that the initialization has been terminated in step 8.

According to the present invention, as described above, the initialization of a failing input/output processing unit is performed after acquisition of correct information on a failure occurring in the input/output processing unit.

Figure 5:
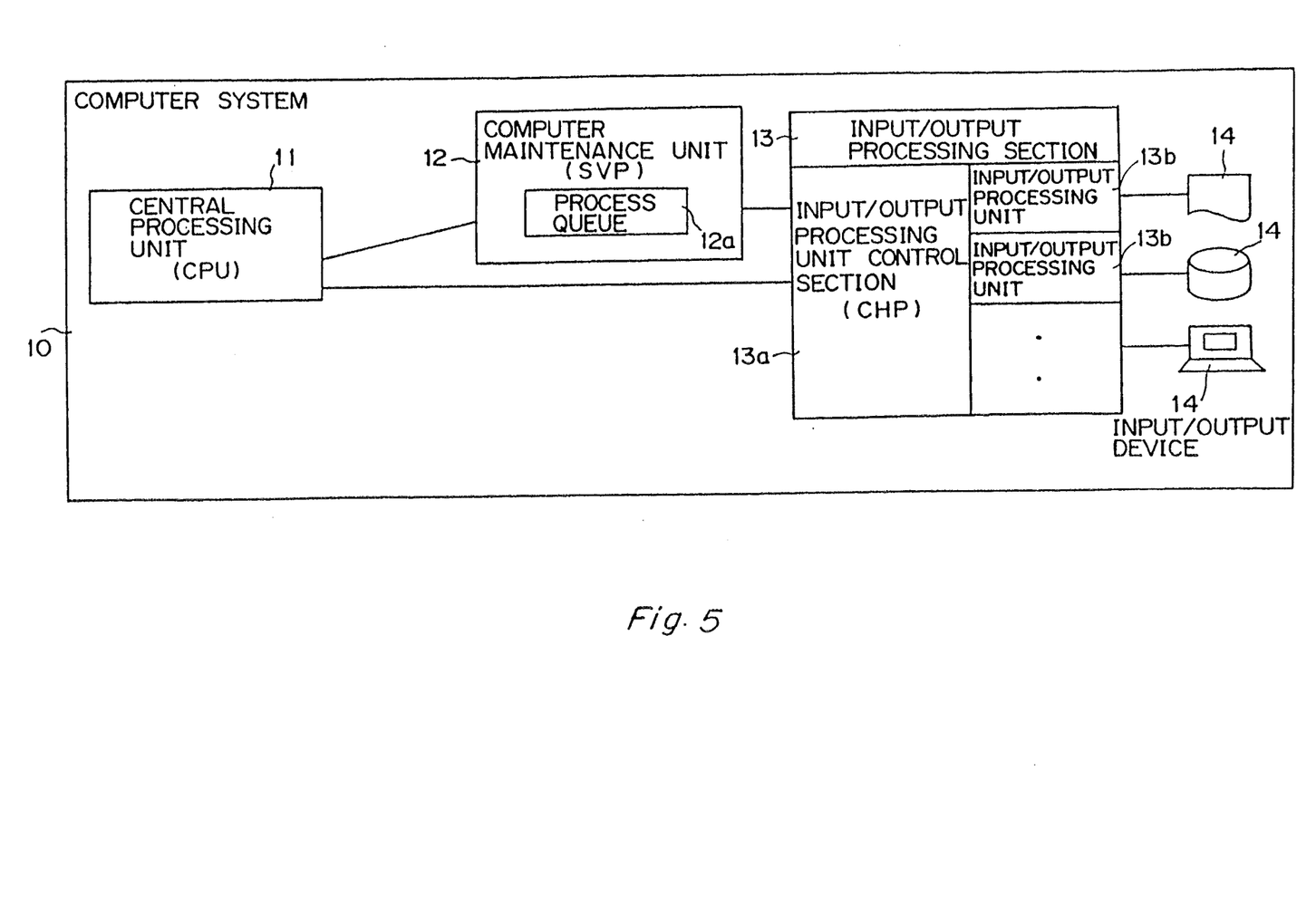
FIG. 5 is an overall block diagram of a computer system employing the initializing system of the present invention.

Referring now to FIG. 5, a computer system 10 utilizing an initializing system according to the present invention comprises a central processing unit 11 which controls the processing of machine language instructions, a computer maintenance unit 12, an input/output processing section 13 and a plurality of input/output devices 14 connected to the input/output processing section 13.

The input/output processing section 13 is comprised of an input/output processing unit control section 13a and a plurality of input/output processing units 13b, and the input/output processing unit control section (CHP) 13a is adapted to control the input/output processing units 13b and to communicate with the central processing unit 11 and the computer maintenance unit 12.

The computer maintenance unit (SVP) 12 controls input/output processing unit control section (CHP) 13a and input/output processing units 13b, the acquisition of failure information and the initialization. The computer maintenance unit 12 contains a process queue 12a for accommodating requests made by the input/output processing section 13 and the central processing unit (CPU) 11 and fetches the requests from the process queue 12a one at a time for processing.

Figure 6:
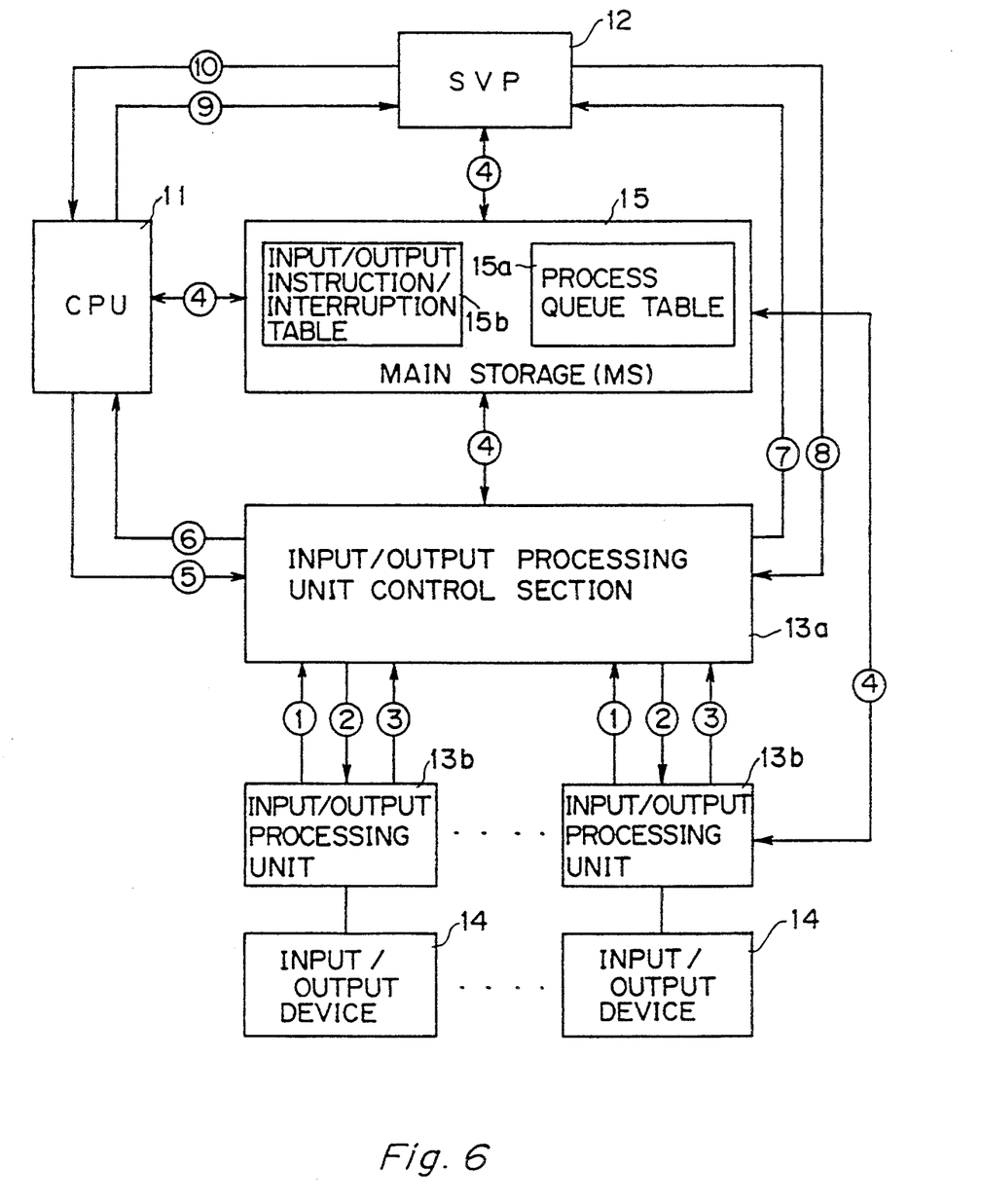
FIG. 6 is an overall block diagram of a computer system in which various units are interconnected by signal lines.

FIG. 6 is an overall block diagram of an embodiment of the computer system whose various components are interconnected by signal lines. The input/output processing unit control section 13a and each of the input/output processing units 13b are connected by an input/output processing unit interruption signal line 3 and an input/output processing unit command signal line 2. When a failure occurs in one of the input/output processing units 13b, an input/output processing unit stop signal 1 is sent from the input/output processing unit to the input/output processing unit control section 13a. The components of the computer system, i.e., the central processing unit 11, the computer maintenance unit 12, the input/output processing unit control section 13a and the input/output processing units 13b are connected to main storage 15 by main storage access buses 4. The central processing unit (CPU) 11 and the input/output processing unit control section (CHP) 13a are connected to each other by an input/output instruction interruption signal line 5 and an input/output processing unit control section interruption signal line 6. In addition, the computer maintenance unit (SVP) 12 and the input/output processing unit control section (CHP) 13a are connected to each other by an SVP processing request signal line 7 and a CHP call signal line 8. Moreover, CPU 11 and SVP 12 are connected to each other by an SVP processing request signal line 9 and a CPU call signal line 10.

Figure 7:
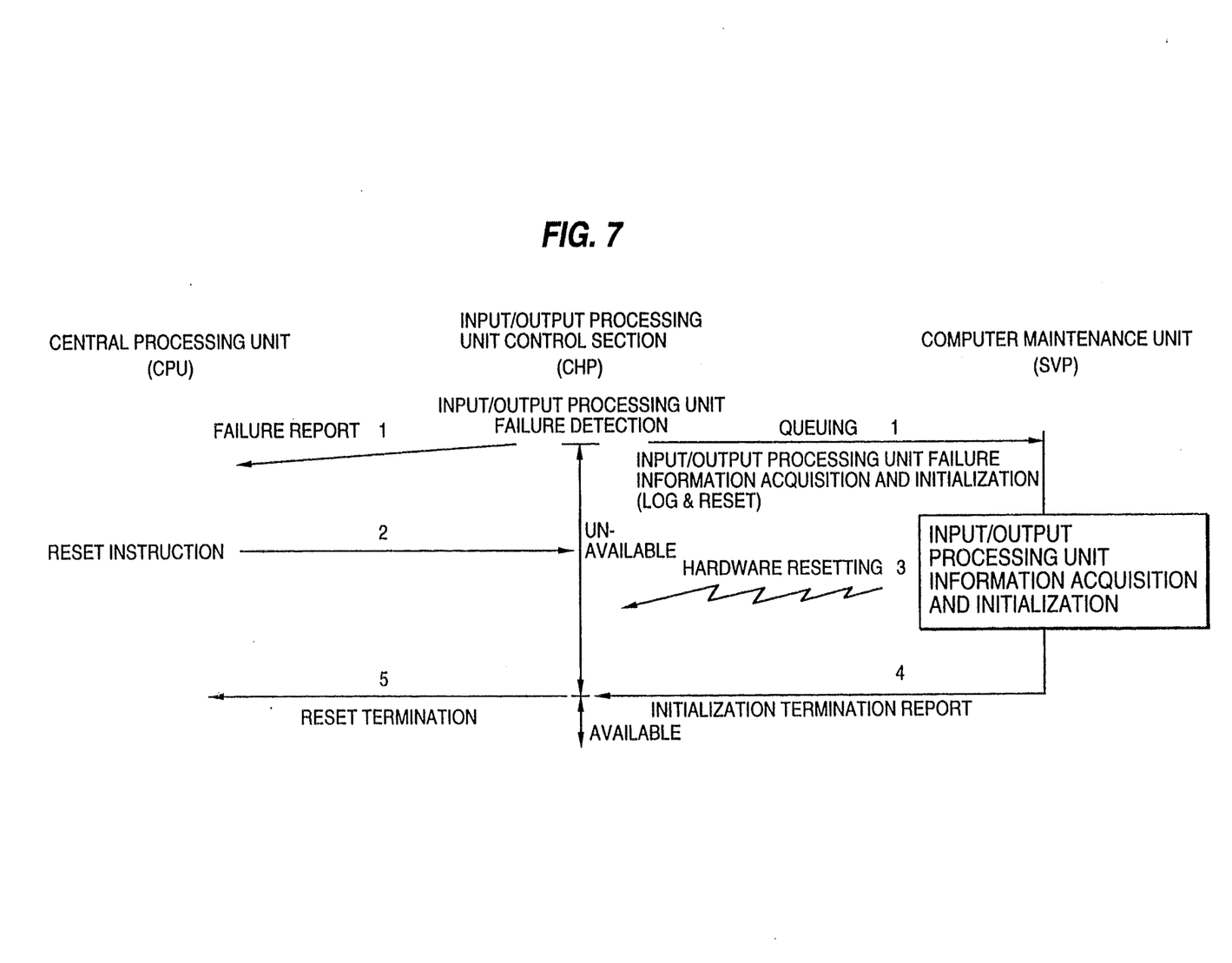
FIG. 7 illustrates a first embodiment of the input/output processing unit initialization procedure at the occurrence of a failure.

FIG. 7 illustrates a first embodiment of the procedure for initializing an input/output processing unit at the occurrence of a failure. It shows the procedure when a reset instruction is entered from the central processing unit 11 to the input/output processing section 13 before the initialization of the input/output processing section by the computer maintenance unit 12 is terminated. In the Figure, when the occurrence of a failure in the input/output processing unit is detected by the input/output processing unit control section (CHP) 13a, a request for acquisition of failure information and initialization (LOG & RESET) is issued to the computer maintenance unit (SVP) 12 as shown by 1. At the same time, the occurrence of a failure is reported to the central processing unit (CPU) 11 as shown by 1.

At this point the contents of the data queuing to SVP 12 will be expressed by "ZZYYL" where ZZ represents a command, YY represents the number of the input/output processing unit 13b and L represents that the data is LOG data issued from CHP 13a. Also, the contents of the failure-reporting interruption data to CPU 11 will be expressed by "XXYY" where XX represents an error code and YY is the same as above.

Although a reset instruction is entered from the central processing unit (CPU)11 into the input/output processing unit control section (CHP) 13a as shown by 2 before the input/output processing unit 13b is initialized by the computer maintenance unit (SVP) 12 as described above, no reset request is newly queued here because the initialization request has already been enqueued in the process queue 12a of the computer maintenance unit 12. The operand of the reset instruction is the above-mentioned "YY" representing the input/output processing unit number.

When the acquisition of failure information from and initialization of the input/output processing unit 13b is effected by the computer maintenance unit (SVP) 12, the hardware is actually reset as shown by 3 and the termination of the initialization is reported to the CHP 13a by the SVP 12 as shown by 4. On receipt of the report, the CHP 13a informs the CPU 11 of the termination of resetting as shown by 5. At this point in time the input/output processing unit 13b becomes available. The operand of the initialization termination report at 4 and the reset termination report at 5 will be represented by "CCYY" where CC represents a result code and YY is the same as above.

Figure 8:
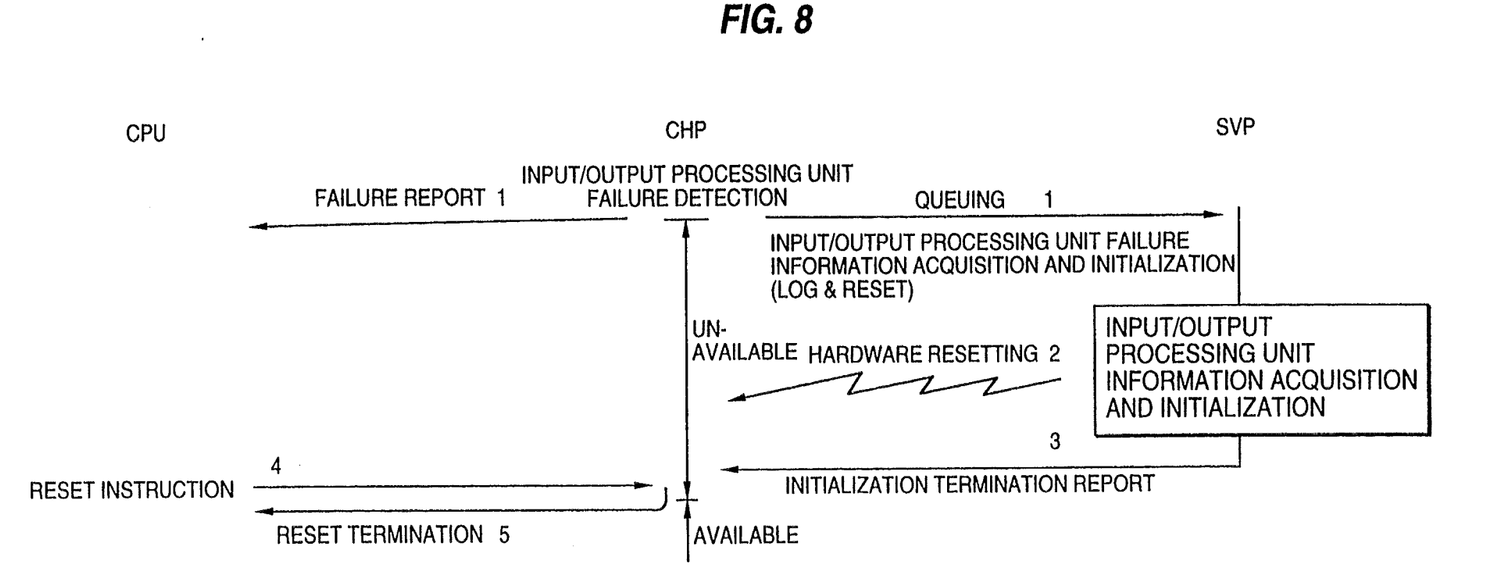
FIG. 8 illustrates a second embodiment of the input/output processing unit initialization procedure at the occurrence of a failure.

FIG. 8 illustrates a second embodiment of the input/output processing unit initialization procedure. Distinct from the first embodiment of FIG. 7, in the second embodiment it is assumed that a reset instruction is entered from the CPU 11 into the CHP 13a after the initialization of the input/output processing unit 13b has been terminated by the SVP 12. As in the case of FIG. 7, when a failure occurs in an input/output processing unit 13b detected by the CHP 13a, a request is issued to the SVP 12 for acquisition of failure information and initialization (LOG & RESET) and, at the same time, the failure is reported to the CPU 11 as shown by 1. The input/output processing unit 13b becomes unavailable from this point of time.

After the failure information has been acquired and the input/output processing unit 13b has been initialized by the SVP 12, the hardware is actually reset as shown by 2 and the termination of the initialization is reported to the CHP 13a as shown by 3. Even if the termination of the initialization is reported from the SVP 12 to the CHP 13a, the input/output processing unit 13b does not become available immediately. In this case, for example, a flag indicating the termination of the initialization of the input/output processing unit 13b is set in the CHP 13a to wait for a reset instruction from the CPU 11.

This is because the computer system reset needs to be completely controlled by software. The CHP 13a cannot make the input/output processing unit 13b available without waiting for a reset instruction from the CPU 11.

When the reset instruction is entered from the CPU 11 into the CHP 13a as shown by 4, the reset termination is reported from the CHP 13a to the CPU 11, as shown by 5, and the input/output processing unit 13b becomes available.

Note that the contents of the failure report interruption data and the data and operands of instructions are the same as those in FIG. 7.

Figure 9:
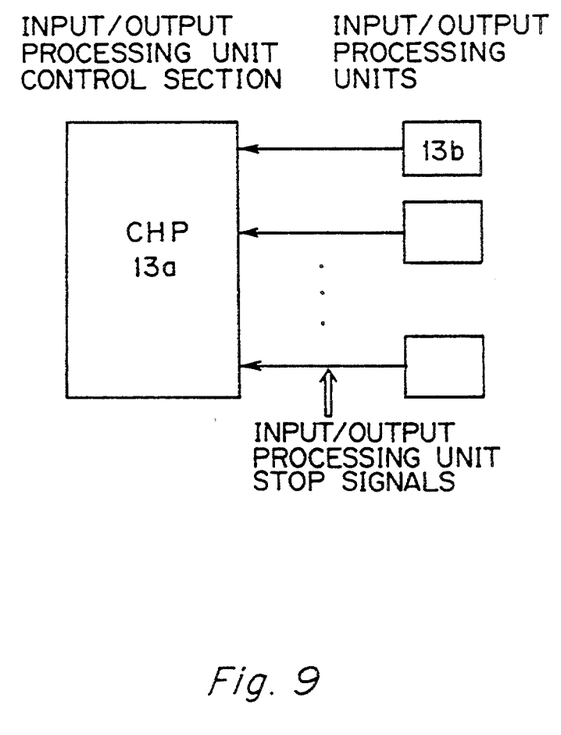
FIG. 9 is a diagram illustrating an embodiment of failure detecting signals from the input/output processing units.

FIG. 9 illustrates an embodiment of failure detection signals from the input/output processing units. When a failure occurs in one of the input/output processing units 13b connected to the input/output processing unit control section (CHP) 13a, an input/output processing unit stop signal is output from the failing input/output processing unit to the input/output processing unit control section 13a.

In the present embodiment, the failures of interest in the input/output processing units 13b mainly include the runaway of microprograms in the input/output processing units and the self-stop of the microprograms in the input/output processing units due to the occurrence of unpredictable errors in the input/output processing units. Methods of detecting such failures include: (1) checking at the time of issuing each input/output instruction, (2) checking at the time of generating an input/output interruption from each of the input/output processing units, and (3) periodical checking of the input/output processing units for the occurrence of a failure. In each of the three methods, the input/output processing unit control section 13a can check the signal lines connecting the input/output processing units 13b to the control section 13a to recognize a failure which might occur in any of the input/output processing units.

Figure 10:
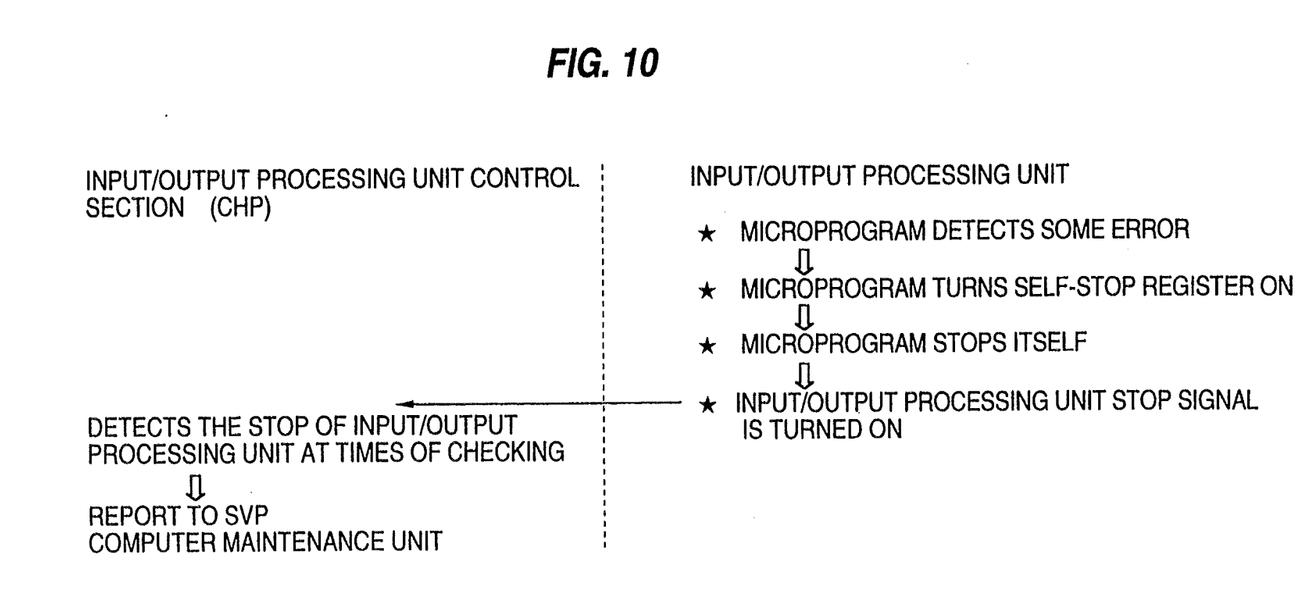
FIG. 10 is a flowchart showing the failure detection process in an input/output processing unit.

FIG. 10 is a flowchart of an embodiment of the process of detecting a failure in an input/output processing unit 13b. When, on the side of the input/output processing unit, a microprogram detects an error, it turns a self-stop register on to stop itself without performing a subsequent processing. As a result, the input/output processing unit stop signal is turned on.

In response to the input/output processing unit stop signal being turned on, the input/output processing unit control section 13a detects the stop of the input/output processing unit at the time of checking according to one of the above three methods and then reports the detection of a failure to the computer maintenance unit 12 to request it to acquire the failure information and initialize the input/output processing unit.

Figure 11:
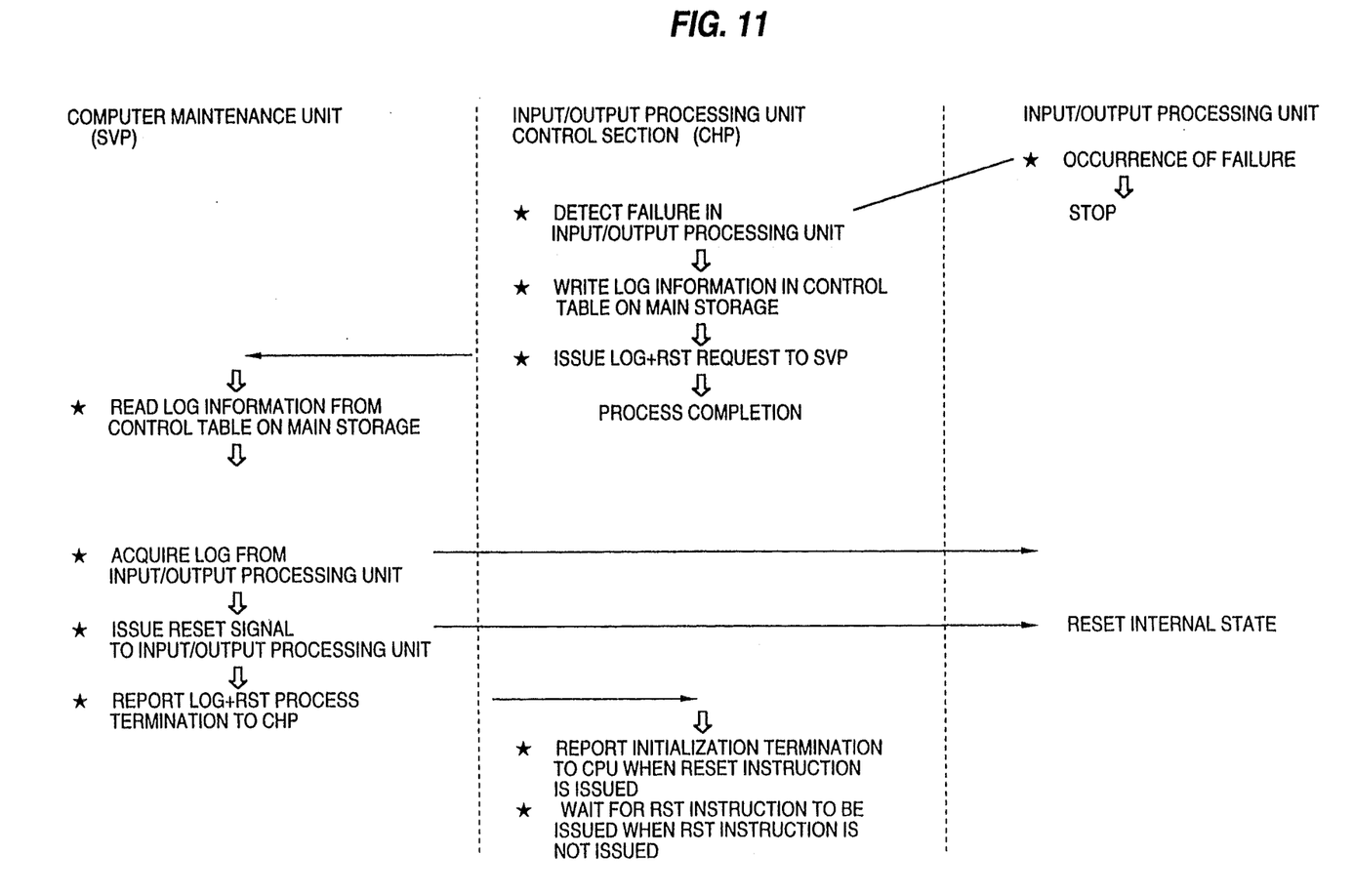
FIG. 11 is a flowchart of a processing conducted by the input/output processing unit control section and the computer maintenance unit.

FIG. 11 is a flowchart of a processing conducted by the input/output processing unit control section 13a and the computer maintenance unit 12 at the time of the occurrence of a failure in an input/output processing unit. Upon detection of the occurrence of a failure in an input/output processing unit, the input/output processing unit control section 13a writes LOG information, which requests the acquisition of failure information, in a control table on the main storage 15 and then issues to the computer maintenance unit (SVP) 12 a request to acquire the failure information (LOG) and initialize the failure-occurring input/output processing unit to thereby bring the processing to an end.

The computer maintenance unit (SVP) 12 reads the LOG information requesting the acquisition of the failure information from the control table on the main storage 15, acquires the failure information from the failing input/output processing unit and then issues a reset signal to the failed input/output processing unit.

As a result, the internal state of the failed input/output processing unit is reset.

Afterward the SVP 12 reports to the input/output processing unit control section (CHP) 13a the termination of the acquisition of the failure information (LOG) and the initialization process (RST). In response to this the CHP 13b reports the termination of initialization to the central processing unit (CPU) 11 immediately after a reset instruction is issued from the central processing unit 11. If the reset instruction has not yet been issued, the input/output processing unit control section 13b waits for the reset instruction to be issued from the central processing unit and then reports the termination of initialization to it upon issue of the reset instruction.

Figure 12:
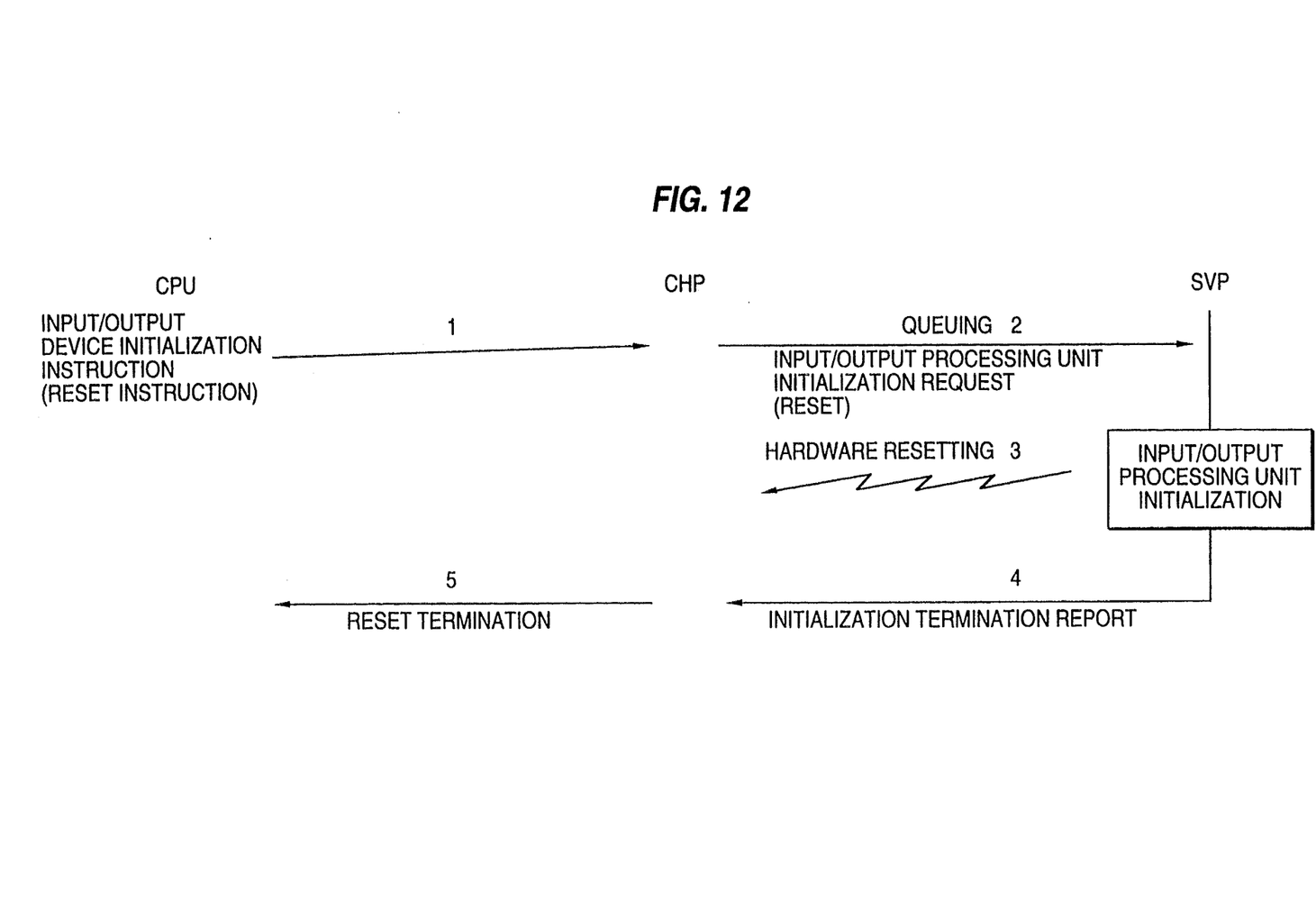
FIG. 12 illustrates the procedure of a reset instruction from the central processing unit when no failure occurs.

FIG. 12 illustrates an embodiment of the procedure of processing a reset instruction from the central processing unit 11 when no failure occurs. When a reset instruction is issued from the CPU 11 to the CHP 13a as shown by 1, the CHP 13a responds to the reset instruction to request the SVP 12 to initialize (reset) the input/output processing unit 13b as shown by 2. The request is enqueued in the process queue 12a.

When the input/output processing unit 13b is initialized by the computer maintenance unit (SVP) 12, the hardware is actually reset as shown by 3 and the termination of initialization is reported to the CHP 13a as shown by 4. In response to this report the CHP 13a reports the reset termination to the CPU 11 by generating an interruption to it, as shown by 5. That is, the generation of the reset instruction at 1 by the CPU 11 is not intended to wait for a report on the reset termination after the time of generating of the reset instruction, and the reset termination is reported from the CHP 13a to the CPU 11 as an interruption. Here the contents of data and operands of reports and instructions are the same as those described in conjunction with FIG. 7 except that the queuing data to the SVP 12 shown at 2 is expressed by "WWYY" where WW represents a command to request initialization only and YY represents the input/output processing unit number.

Upon acceptance of the reset instruction from the CPU 11 at 1 of FIG. 12, the CHP 13a holds a flag indicating that the specified input/output processing unit is in the process of being initialized to thereby place the input/output processing unit in the input/output instruction-unacceptable state. This state is continued until the reset termination is reported to the CPU 11 as shown by 5.

In the above embodiment, the present invention was described only in terms of failures in the input/output processing units. Failures in the input/output processing unit control section 13a may be processed by means of, for example, time supervision by the central processing unit 11, and failures in an input/output device 14 may be processed by means of an output interruption detected by the corresponding input/output processing unit 13b. Furthermore, even if failures occur simultaneously in the input/output processing units connected to the input/output processing unit control section 13a, those failures may be processed independently because the processes of the computer maintenance unit 12 are carried out asynchronously. The operands of instructions and the like are also the same as those described above.

What is claimed is:

1. In a computer system including a central processing unit, a computer maintenance unit and an input/output processing section having input/output processing units each of which is associated with an input/output device, an initializing system for initializing said input/output processing units comprising:

request means for causing said input/output processing section to request said computer maintenance unit to acquire failure information when a failure occurs in one of the input/output processing units;

initialization means for causing said computer maintenance unit to initialize said one of the input/output processing units which failed after acquisition of the failure information; and report means for causing said input/output processing section to report to said central processing unit termination of initialization of the one of said input/output processing units which failed, said input/output processing section informing the central processing unit of the failure, and said central processing unit issuing a reset instruction to said input/output processing section, and when the reset instruction is received by said input/output processing section before said computer maintenance unit transmits a reset command to said one of the input/output processing units, said input/output processing section not executing the reset instruction and not initializing said one of the input/output processing units responsive to the reset instruction.

2. In a computer system including a central processing unit, a computer maintenance unit and an input/output processing section having input/output processing units each of which is associated with an input/output device and an input/output processing unit control section connected to said input/output processing units, a method of initializing said input/output processing units, said method comprising the steps of:

(a) issuing from said central processing unit to said input/output processing unit control section a reset instruction to initialize one of the input/output processing units among said input/output processing units;

(b) setting, performed by said input/output processing unit control section, said one of the input/output processing units to be initialized into an input/output-instruction unacceptable state responsive to said issuing step (a);

(c) requesting, performed by said input/output processing unit control section, said computer maintenance unit to initialize said one of the input/output processing units;

(d) initializing, performed by said computer maintenance unit, said one of the input/output processing units;

(e) reporting, performed by said computer maintenance unit, a termination of the initialization of said one of the input/output processing units to said input/output processing unit control section;

(f) reporting, performed by said input/output processing unit control section, the termination of the initialization to said central processing unit; and (g) restoring, performed by said input/output processing control section, said one of the input/output processing units to an input/output-instruction acceptable state after the termination of the initialization is reported to the central processing unit.

3. In a computer system including a central processing unit, a computer maintenance unit and an input/output processing section having input/output processing units each of which is associated with an input/output device, an initializing method for initializing said input/output processing units, comprising the steps of:
  (a) causing said input/output processing section to request said computer maintenance unit to acquire failure information when a failure occurs in one of the input/output processing units;
  (b) causing said computer maintenance unit to initialize said one of the input/output processing units after acquisition of the failure information; and
  (c) causing said input/output processing section to report to said central processing unit termination of initialization of said one of the input/output processing units which failed, said input/output processing section informing the central processing unit of the failure, and said central processing unit issuing a reset instruction to said input/output processing section, and when the reset instruction is received by said input/output processing section before said computer maintenance unit transmits a reset command to said one of the input/output processing units, said input/output processing section not executing the reset instruction and not initializing said one of the input/output processing units responsive to the reset instruction.

4. The initializing method according to claim 3, wherein said input/output processing section includes an input/output processing unit control section connected to said input/output processing units,
  wherein said initializing method further comprises before said prompting step (a), the step of detecting performed by the input/output processing unit control section, the failure in said one of the input/output processing units,
  wherein said prompting step (a) and said prompting step (b) are performed by said input/output processing unit control section, and
  wherein said prompting step (c) further comprises the step of reporting, performed by the input/output processing unit control section, to said central processing unit the termination of the initialization of said one of the input/output processing units after said one of the input/output processing units has been initialized.

5. The initialization method according to claim 3, wherein said input/output processing section includes an input/output processing unit control section connected to said input/output processing units,
  wherein said initialization method further comprises before said prompting step (a), the step of detecting performed by the input/output processing unit control section, the failure in said one of the input/output processing units,
  wherein said prompting step (a) and said prompting step (b) are performed by said input/output processing unit control section,
  wherein said initialization method further comprises before said prompting step (c), the steps of:
    reporting performed by said input/output processing unit control section, the failure to said central processing unit and setting said one of the input/output processing units as unavailable:
    issuing, responsive to said reporting step, a reset instruction from said central processing unit to said input/output processing unit control section;
    executing, performed by said computer maintenance unit, the acquisition of the failure information from said one of the input/output processing units;
    initializing, performed by said computer maintenance unit, said one of the input/output processing units; and
    notifying, performed by said computer maintenance unit, the termination of the initialization to said input/output processing unit control section, and
  wherein said prompting step (c) further comprises the steps of:
    reporting, performed by said input/output processing unit control section, the termination of the initialization of said one of the input/output processing units to said central processing unit; and
    setting, performed by said input/output processing unit control section, said one of the input/output processing units as available.

6. The initialization method according to claim 3, wherein said input/output processing section includes an input/output processing unit control section connected to said input/output processing units,
  wherein said initialization method further comprises before said prompting step (a), the step of detecting performed by the input/output processing unit control section, the failure in said one of the input/output processing units,
  wherein said prompting step (a) and said prompting step (b) are performed by said input/output processing unit control section,
  wherein said initialization method further comprises before said prompting step (c), the steps of:
    reporting, performed by said input/output processing unit control section, the failure to said central processing unit and setting said one of the input/output processing units as unavailable;
    reporting, performed by said computer maintenance unit responsive to said prompting step (a) for the failure information and said prompting step (b) to initialize said one of the input/output processing units, the termination of the initialization to said input/output processing unit control section; and
    issuing, responsive to said reporting step performed by said input/output processing unit control section, a reset instruction from said central processing unit to said input/output processing unit control section, and
  wherein said prompting step (c) further comprises the step: of:
    reporting, performed by said input/output processing unit control section, the termination of the initialization of said one of the input/output processing units to said central processing unit, and
    setting, performed by said input/output processing unit control section, said one of the input/output processing units as available.

7. The initializing method according to claim 3, wherein said one of the input/output processing units includes a microprogram unit, and
  wherein said initialization method further comprises before said prompting step (a), the steps of:
    detecting, performed by said microprogram unit, an error upon an occurrence of the failure;
    turning on, performed by said microprogram unit a self-stop register and stopping the processing;
    turning on, performed by said microprogram unit, an input/output processing unit stop signal; and detecting, performed by input/output processing unit control section and responsive to said input/output processing unit stop signal, the failure in said one of the input/output processing units.

8. The initializing method according to claim 3, further comprising the steps of:
   detecting the failure in said one of the input/output processing units;
   writing, performed by said input/output processing unit control section, a request for the failure information from said one of the input/output processing units in a main storage and requesting said computer maintenance unit to acquire the failure information from said one of the input/output processing units and initializing said one of the input/output processing units;
   reading, performed by said computer maintenance unit, the request from said main storage, acquiring the failure information from said one of the input/output processing units, issuing a reset signal to said one of the input/output processing units, and reporting the termination of the acquisition of the failure information and the initialization to said input/output processing unit control section; and
   reporting, performed by said input/output processing unit control section the termination of the initialization to said central processing unit when a reset instruction set in said one of the input/output processing units has been issued from said central processing unit, and waiting for said reset instructions to be issued from said central processing unit when said reset instruction has not been issued and reporting the termination of the initialization to said central processing unit upon issue of said reset instruction.

9. An initializing system for initializing input/output processing units, comprising:
   a central processing unit issuing a reset instruction to initialize one of the input/output processing units upon receipt of a first message indicating said one of the input/output processing units has failed;
   a computer maintenance unit connected to said central processing unit issuing a reset command upon receipt of a second message including failure information and an initialize request to initialize said one of the input/output processing units; and
   an input/output processing section including the input/output processing units and connected to said computer maintenance unit, detecting the failure and transmitting said first and second messages to and receiving said reset instruction and command from said central processing unit and said computer maintenance unit, respectively, and when said reset instruction is received before said reset command, said input/output processing section not executing said reset instruction and not initializing said one of the input/output processing units responsive to said reset instruction.

10. An initializing method for initializing input/output processing units, comprising the steps of:
   (a) detecting a failure in one of the input/output processing units;
   (b) informing a central processing unit of the failure and issuing a reset instruction from the central processing unit responsive to the failure;
   (c) informing a computer maintenance unit of the failure including failure information and issuing a reset command from the computer maintenance unit responsive to the failure;
   (d) receiving the reset instruction and command by an input/output processing section; and
   (e) initializing the input/output processing units, wherein when said receiving step (d) receives the reset instruction before the reset command, said reset instruction is not executed and the one of the input/output processing units is not initialized responsive to the reset instruction.

* * * * *

UNITED STATES PATENT AND TRADEMARK OFFICE
CERTIFICATE OF CORRECTION

PATENT NO. : 5,438,675
DATED : August 1, 1995
INVENTOR(S) : Fujioka

It is certified that error appears in the above-indentified patent and that said Letters Patent is hereby corrected as shown below:

Col. 1, line 17, change "Invention" to --Related Art--.
Col. 3, line 43, after "(RST)", delete "the".
Col. 10, line 50, change "step:" to --steps--.
      line 54, change "," to --;--.

Signed and Sealed this

Ninth Day of January, 1996

Attest:

BRUCE LEHMAN

*Attesting Officer*     *Commissioner of Patents and Trademarks*